No. 687,781. Patented Dec. 3, 1901.
F. H. PIERPONT.
APPARATUS FOR MILLING, JUSTIFYING, AND MEASURING MATRICES, &c.
(Application filed June 5, 1901.)
(No Model.) 7 Sheets—Sheet 1.

No. 687,781. Patented Dec. 3, 1901.
F. H. PIERPONT.
APPARATUS FOR MILLING, JUSTIFYING, AND MEASURING MATRICES, &c.
(Application filed June 5, 1901.)
(No Model.) 7 Sheets—Sheet 4.

No. 687,781. Patented Dec. 3, 1901.
F. H. PIERPONT.
APPARATUS FOR MILLING, JUSTIFYING, AND MEASURING MATRICES, &c.
(Application filed June 5, 1901.)
(No Model.) 7 Sheets—Sheet 6.

No. 687,781. Patented Dec. 3, 1901.
F. H. PIERPONT.
APPARATUS FOR MILLING, JUSTIFYING, AND MEASURING MATRICES, &c.
(Application filed June 5, 1901.)
(No Model.) 7 Sheets—Sheet 7.

UNITED STATES PATENT OFFICE.

FRANK HINMAN PIERPONT, OF HORLEY, ENGLAND, ASSIGNOR TO LANSTON MONOTYPE MACHINE COMPANY, OF WASHINGTON, DISTRICT OF COLUMBIA, A CORPORATION OF VIRGINIA.

APPARATUS FOR MILLING, JUSTIFYING, AND MEASURING MATRICES, &c.

SPECIFICATION forming part of Letters Patent No. 687,781, dated December 3, 1901.

Application filed June 5, 1901. Serial No. 63,284. (No model.)

*To all whom it may concern:*

Be it known that I, FRANK HINMAN PIERPONT, a citizen of the United States, residing at Horley, in the county of Surrey, England, have invented certain new and useful Improvements in or Relating to Apparatus for Milling, Justifying, and Measuring Matrices and other Bodies; and I do hereby declare the following to be a full, clear, and exact description of the same, reference being had to the accompanying drawings, forming a part of this specification, and to the letters of reference marked thereon.

This invention relates to an improved milling and measuring machine specially intended for reducing the matrices used in type-casting machines to uniform length and to uniform depth of drive, but capable of being used for measuring and milling other bodies.

In the accompanying drawings, Fig. 9 is a front elevation, partly in section, of the matrix-holder.

Like letters of reference in the several figures indicate the same parts.

Carried on a bed-plate $A^2$ by standards $A^3$ $A^4$ $A^5$ is a bed A, having a central longitudinal dovetail slot A'. Fixed centrally on and at right angles to the bed A, by means of bolts $A^6$, is a frame B, of which the sides B' form guides for a slide C, having a gooseneck C', in which is a rod D', formed with an angle in its lower end adapted to engage one corner of a matrix. This rod forms the upper jaw of a gripping device and is capable of vertical reciprocation by means of a screw $D^2$. The lower jaw D, shaped to engage two adjacent sides of the matrix, forms the head of a dovetailed bar $D^3$, capable of vertical reciprocation in a block $C^2$, held in a recess in the front of the slide C. The block $C^2$ has a backward extension $C^3$, from the front of which extends a lug $C^4$, in which is engaged the stem of a micrometer-screw $D^4$, which engages a screw-thread in the bar $D^3$. The screw $D^4$ is provided with a disk $D^5$, marked with a scale, allowing a very fine adjustment of the screw, and consequently of the lower jaw D of the gripping device, in a vertical direction.

Engaged in the front wall of the frame B is a second micrometer-screw $B^2$, having an adjusting-disk $B^3$, provided with a finely-graduated scale. The end of this screw abuts against a hardened-steel plug $C^5$, inserted in the front of the slide C, limiting the forward movement of the said slide, and thus admitting of a very fine adjustment of the gripping-jaws in a horizontal direction.

Figure 4:
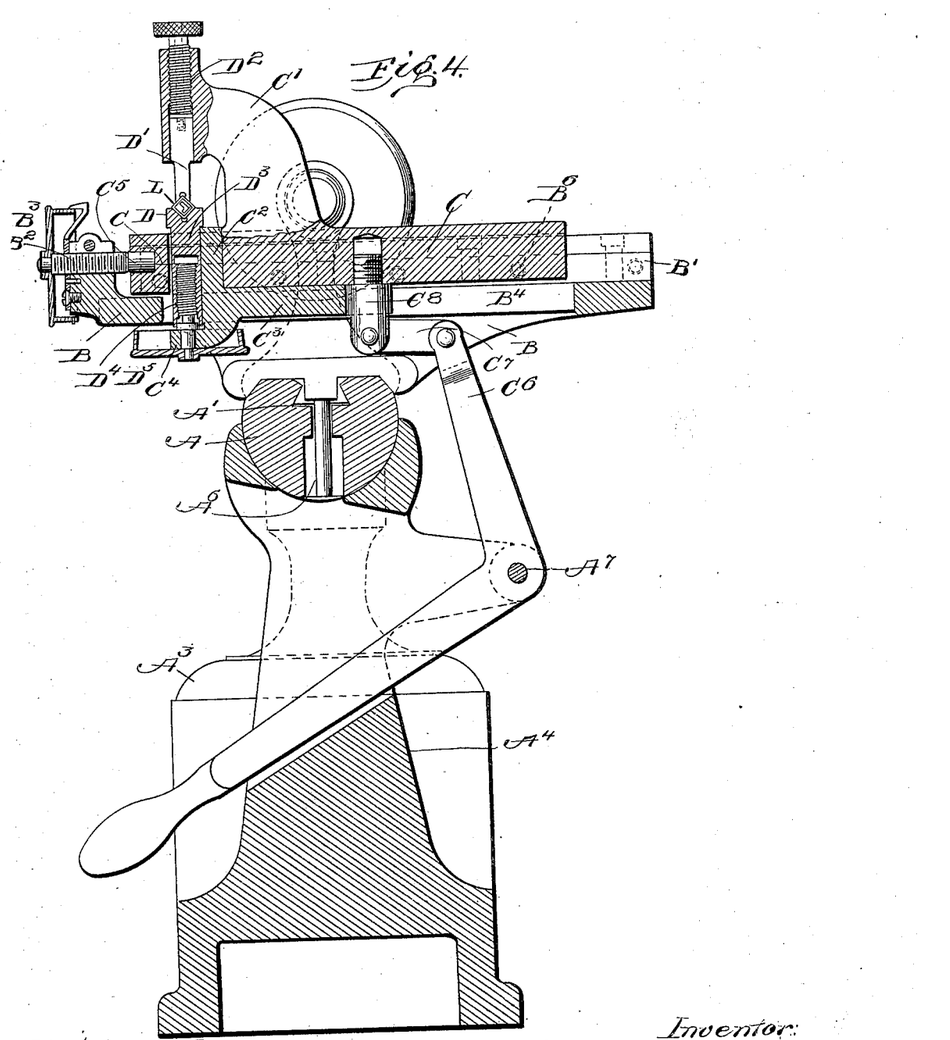
Fig. 4 is a section on the line 4 4 of Figs. 1 and 2.
Figure 5:
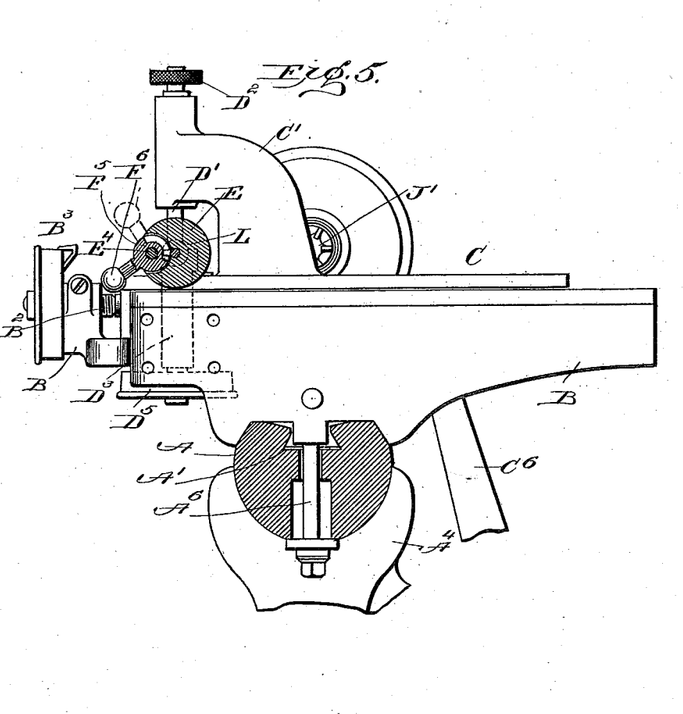
Fig. 5 is a section on the line 5 5 of Figs. 1 and 2, the standard and bed-plate being broken away.

The slide C is reciprocated in the frame B by means of a bell-crank lever $C^6$, pivoted at $A^7$ in lugs on the back of the standard $A^4$, the handle-arm of the lever conveniently extending to the front of the machine and working in a slot in said standard. The short arm of the lever is pivotally connected by a link $C^7$ to the head of a pin $C^8$, fastened in the slide C. The pin works in a slot $B^4$, provided for that purpose in the frame B. The handle of the lever $C^6$ is raised to move the slide backward and is made of such a weight that when uncontrolled it holds the slide normally in its most forward position—that is, engaged with the end of the micrometer-screw $B^2$, as seen in Fig. 4. Extreme accuracy of movement is necessary on the part of the slide C, and conveniently one of the guideways is formed of a hardened-steel bar $B^5$, adjustable by screws $B^6$, as seen best in Figs. 2 and 9.

Figure 2:
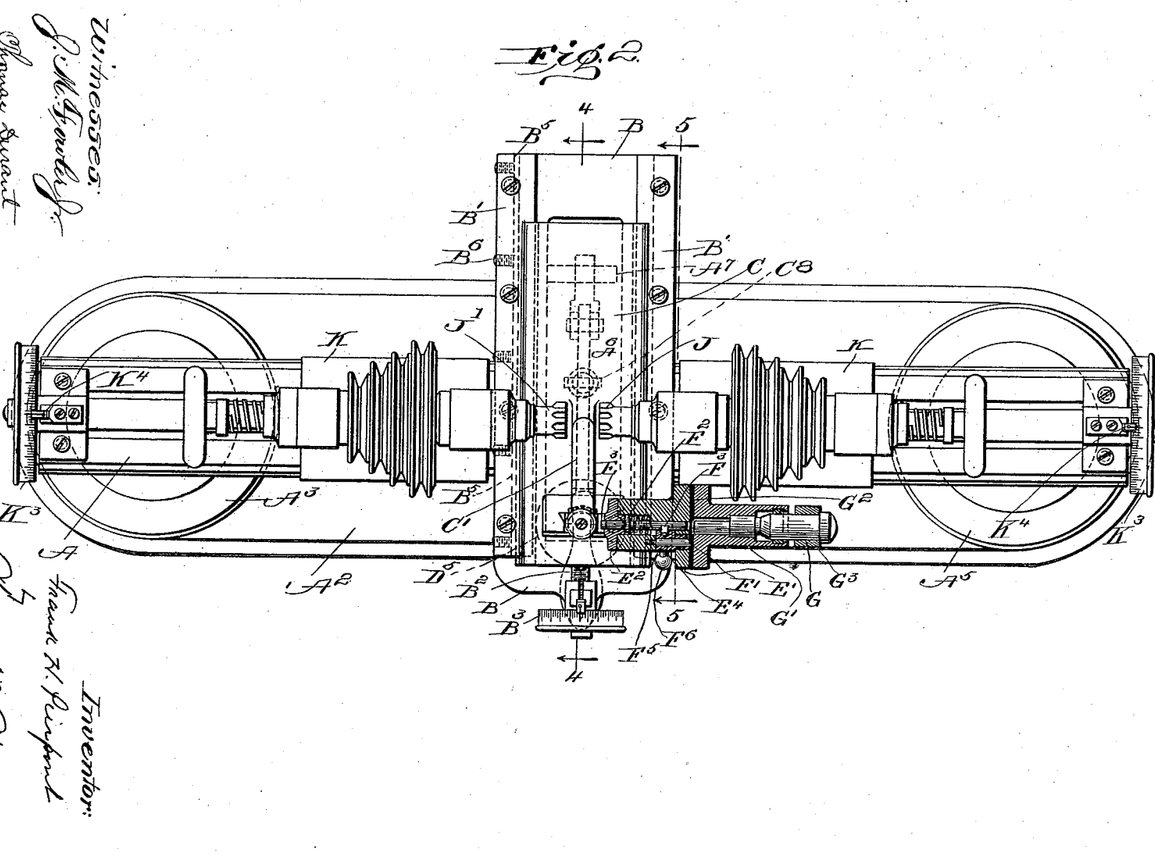
Fig. 2 is a plan, partly in section.
Figure 7:
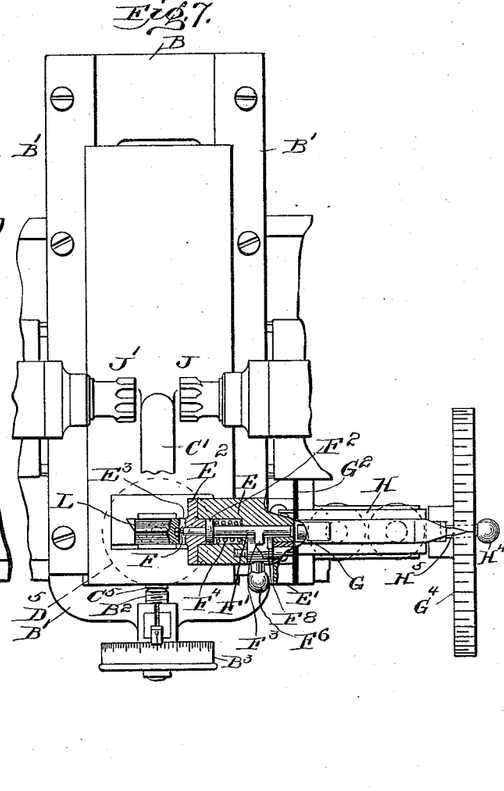
Figure 10:
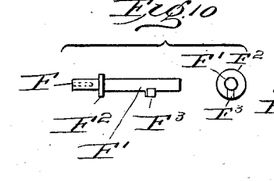
Fig. 10 is a side and end view of the measuring-needle and its holder detached.

Fastened onto one side of the frame B is a plate E', having a boss E, which is formed with a central chamber to receive the positioning and measuring needle holder F'. (Shown detached in Fig. 10.) The needle F is secured in one end of the holder, which is provided with a collar F² and offset F³. On the front of the boss is secured a cap E², having a central raised portion E³, which forms a "fixed stop." The boss is so positioned relative to the gripping device that when the latter is in its normal or forward position the needle coincides with the drive of a matrix when resting in the lower jaw. Behind the collar F² on the holder F' is a coiled spring F⁴, which tends normally to hold the needle in its most forward position, as shown in Figs. 2 and 7.

Figure 11:
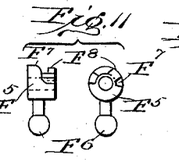
Fig. 11 shows two views of the needle-controlling cam detached.
Figure 12:
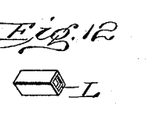
Fig. 12 is a perspective view of a matrix.

Pivoted on a pin E⁴ in a recess in the side of the boss E is a short cylindrical block F⁵, Fig. 11, having a handle F⁶. This block is recessed to engage the needle-holder offset F³, the front surface of the recess forming a cam-curve F⁷, which engages the front edge of the offset and is so shaped that when the handle F⁶ is in its raised position (see Fig. 6) the needle-holder is forced back against the tension of the spring F⁴, while when the handle is lowered, as shown in Fig. 7, the needle-holder is in its forward position, a stop F⁸, placed on the cam-block, so as to be behind the offset when in this position, preventing the holder from any possibility of backward movement. Fastened onto the plate E' on the opposite side to the boss E is a cylindrical flanged casing G', in which is held a micrometer-screw placed so as to be in line with the needle-holder, but normally not in contact with the same. The casing G' and its micrometer are electrically insulated from the rest of the machine by a washer G². This micrometer-screw may be of any usual construction and need not therefore be particularly described. Fastened onto its head is a vertical metal arm or bar G³, surmounted by a quadrant G⁴, marked with a deeply-indented scale. The bar G³ is provided with a slot G⁵, one side of which is lined with a strip G⁶ of insulating material, Fig. 3.

Figure 1:
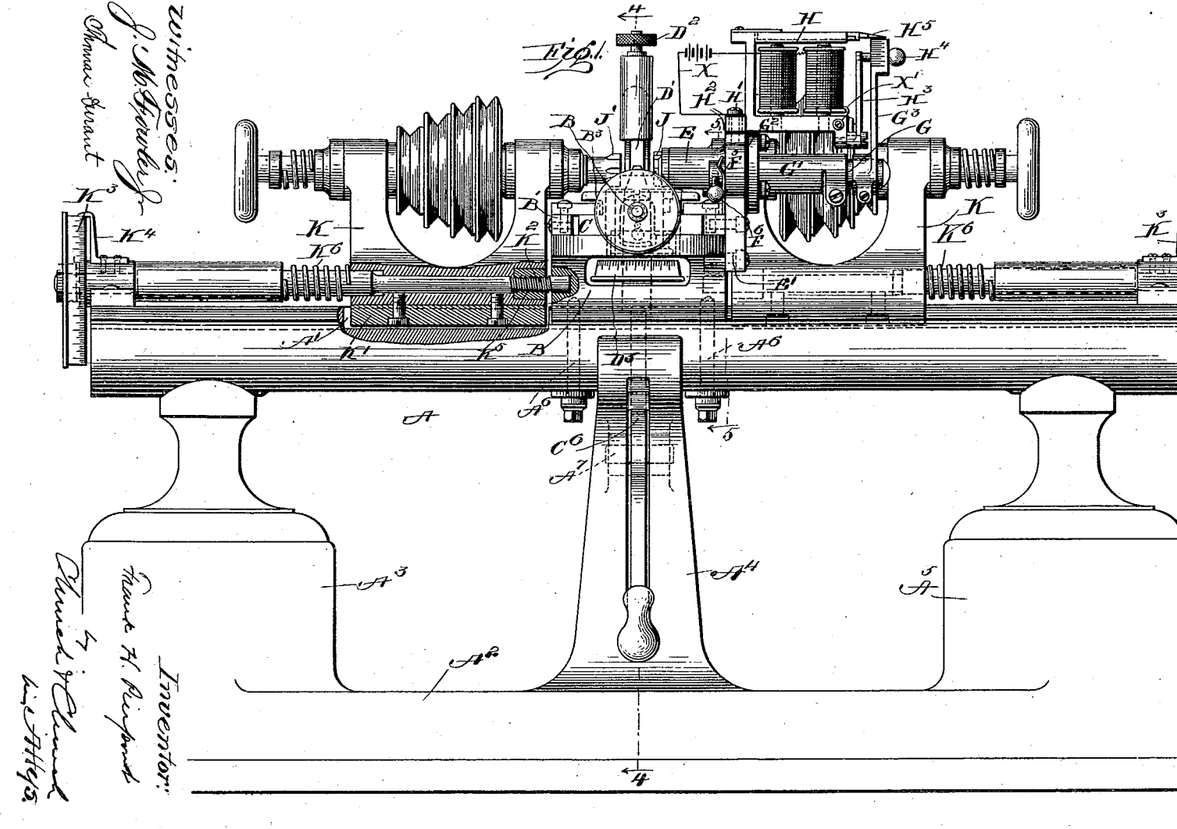
Figure 1 is a front elevation of a preferred construction of machine according to this invention adapted for finishing and testing matrices such as are used in type casting and setting machines of the Lanston monotype class.
Figure 3:
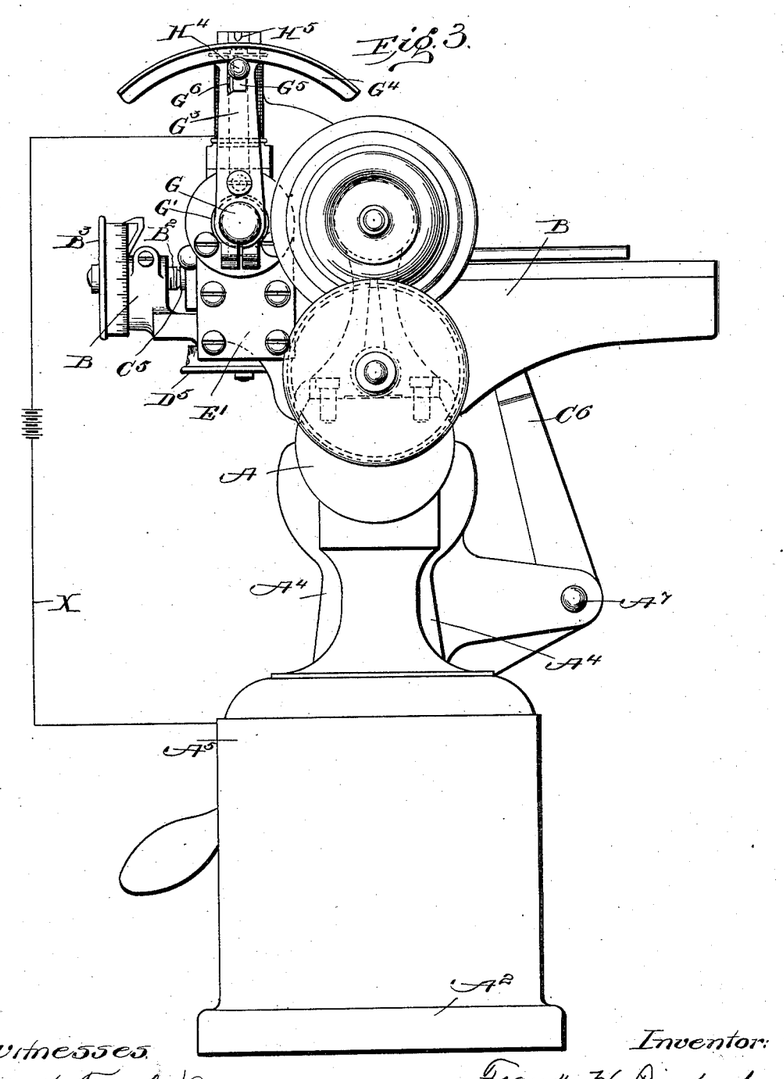
Fig. 3 is a right-hand end elevation.

Placed above the micrometer-screw is an electromagnet H, its yoke being conveniently fixed on the top of the plate E' by a screw H', carefully insulated, however, from the plate by non-conducting washers H², Fig. 1. One wire of the electromagnet is connected with one terminal of an electric battery or other source of electricity, and the other terminal of said battery being connected to the needle-holder block, as indicated by lines X, Fig. 1, or other convenient part of the machine, such as the standard A⁵, as shown in Fig. 3. The other wire of the electromagnet may be connected to the yoke or frame, as at X'. Thus the battery-circuit is made to contain or include two contact devices, the one formed by the needle-holder and micrometer-screw and the other by the arm G³ and handle H⁴.

The magnet-armature is provided with a knife-blade end H⁵, which extends over the quadrant G⁴ and is adapted to engage with the indented lines of the quadrant-scale when the magnet is excited. A rocking arm H³, pivoted onto the lower plate of the yoke, is provided with a handle H⁴, loosely engaged in the slot G⁵ of the arm G³ of the micrometer-screw. By moving the handle H⁴ to the right, Fig. 3, the micrometer-screw will be advanced toward the needle-holder and at the same time the electromagnet will be connected electrically with the micrometer-screw by the contact of the arm H⁴ with the uninsulated side of the slot G⁵. On the other hand, by moving the handle toward the left, Fig. 3, the micrometer-screw will be withdrawn farther from the needle-holder, while owing to the insulation G⁶, the handle being now held against the insulated side of the slot, electrical connection between the magnet and the screw will be broken.

The machine now being described is intended to detect errors of one ten-thousandth of an inch within a range of one one-thousandth above or below normal. The micrometer-screw is so placed relatively to the end of the needle-holder that their ends will come in contact in the operation of measuring (to be hereinafter described) if the matrix drive be of normal depth when the armature head or catch is over the middle or zero graduation of the quadrant, as shown in Fig. 3. Ten graduation-marks, each representing a movement of the micrometer-screw through one ten-thousandth of an inch, are provided on each side of this zero-mark. When the handle is moved toward the right, it touches the side of the slot before it can alter the position of the screw, thus completing the circuit at this point, and when the micrometer-screw contacts with the needle-holder the electromagnet is energized and the armature-catch engages the graduation-mark, locking the quadrant. If the handle is now moved toward the left, the circuit is broken before the micrometer-screw commences to leave the needle-holder, so that danger of injury to these surfaces or to the matrix and measuring-needle at this time by sparking is avoided.

Placed opposite to each other, one on each side of the gooseneck C', are two milling-tools J J'. These tools and their mountings are identical and one description applies to both. Each is fixed on a revoluble spindle mounted on a block K, carried on a dovetail slide K', engaged in the guideway A' of the bed A. The reciprocation of each block K is controlled by a micrometer-screw K², as shown in Fig. 1, where part of the bed-plate A is broken away to more clearly show the arrangement. The screw is operated by a wheel-disk K³, on which is marked a scale, each graduation of which indicates a movement of the milling-tool equal to one ten-thousandth of an inch. An index-finger K⁴ is provided, and the tools and screw are so arranged that when the index-fingers are at zero-point on the graduated scales the milling-tools are a distance apart exactly equal to the length of the matrix to be finished.

Perfect rigidity and exactness are necessary in the adjustments of this machine, and to insure these preferably a hardened-steel block K⁵, Fig. 1, is fixed in the block K to receive the thread for the micrometer-screw, and a spring K⁶ is provided, putting the block under tension in one direction.

Figure 6:
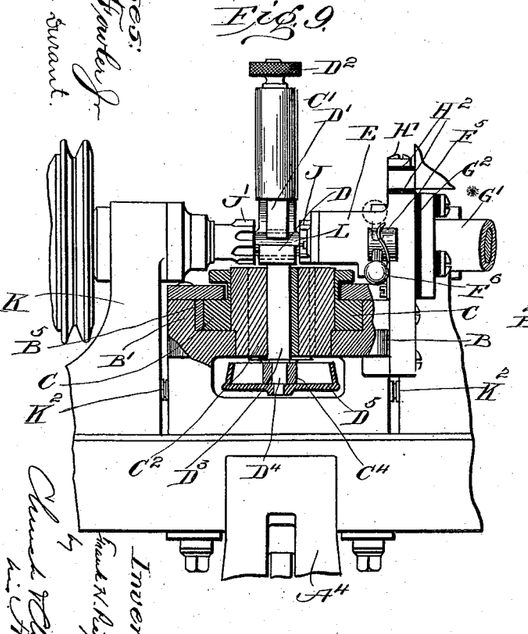
Figs. 6, 7, and 8 are plans, partly in section, of the central portion of the machine, showing three different positions of the matrix and its measuring device.
Figure 8:
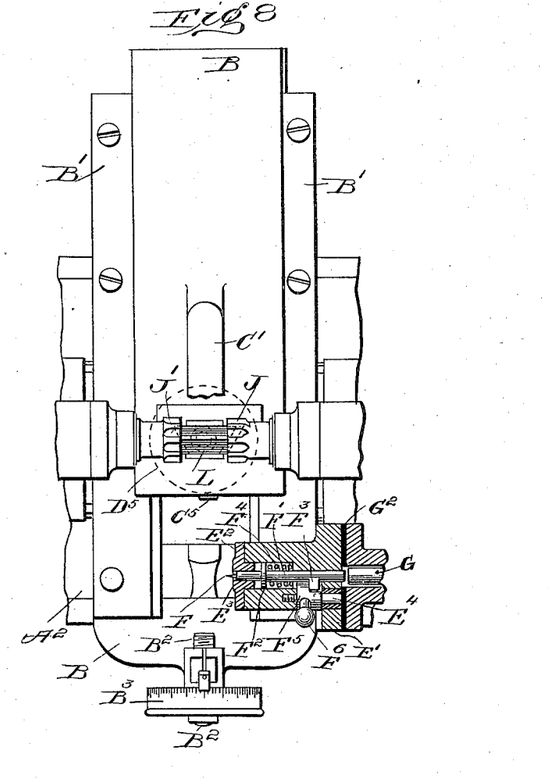

The operation of the machine is as follows: The matrix-holder or lower jaw D of the slide C is set vertically and horizontally by means of the micrometer-screws D⁴ B² in a position indicated by a chart previously prepared giving the required position of their respective graduated disks for each character, so that the matrix to be measured when placed upon the lower jaw will present a certain spot on the face of the driven character to the measuring or positioning needle F. The cam-block handle F⁶ is lowered. The spring F⁴ presses the needle-holder forward into the position shown in Fig. 7, in which position it is locked by the stop F⁸. The operator lays the matrix L on and moves it gently along the lower jaw or holder until the needle-point is in contact with the selected point on the character face, when the upper jaw is lowered and the matrix firmly gripped. The cam-block handle is then raised, removing the positioning-needle from the matrix-drive. The milling-tools J J' are normally placed relatively to the needle-point when the needle is in its advanced and locked position so as to give the matrix its normal length and depth of drive. The slide C is now reciprocated by means of its handle-lever C⁶, carrying the matrix between the revolving end milling-cutters J J', as shown in Fig. 8, and then returning to its normal position. The upper gripping-jaw is withdrawn and the matrix released. The handle F⁶ of the cam-block F⁵ being in its raised position, holding the needle-holder back in the position shown in Fig. 8, the graduated quadrant of the micrometer-screw is placed so that its right-hand end is under the armature catch, withdrawing the micrometer-screw to its most distant position from the needle-holder. The operator now advances the matrix until its end is in contact with the fixed stop E³, as shown in Fig. 6, pushing the needle (whose holder, it will be remembered, is now only held by the tension of the spring F⁴, the stop F⁸ being out of engagement with the offset F³) farther back. While holding the matrix against the fixed stop with one hand with the other the operator moves the quadrant-operating handle H⁴ so as to advance the micrometer-screw. Directly this comes in contact with the needle-holder the electric circuit is closed, as before described, and the armature-catch engages one of the quadrant-graduations and locks the quadrant, and with it the micrometer-screw. The graduation engaged informs the operator within one ten-thousandth of an inch of any error in the depth of the drive. If normal, the armature engages the central or zero graduation. By reversing the movement of the handle the circuit is broken, and the matrix is then allowed to leave the fixed point. If the depth of drive is found to be too small, the matrix is discarded. If too long, it is again subjected to the milling operation, the tool J being advanced by its micrometer-adjusting screw an amount sufficient to correct by the second end milling of the matrix the error that was found after the first milling.

The matrix before being justified, as above described, is preferably shaped in a stamping-press and after milling in this machine is merely brushed and is then ready for use, the grinding and lapping operations which have hitherto been resorted to to justify and finish such bodies being rendered unnecessary.

It is evident that if the apparatus be intended only to justify the depth of drive, without reference to the length over all of the matrix, it may be constructed with only one cutter J, the cutter J' being omitted.

Having thus described my invention, what I claim as new, and desire to secure by Letters Patent, is—

1. In a matrix-justifying machine the combination with an adjustable milling-tool, and a movable blank-carrying slide provided with a gripping device, of a positioning-needle for engaging the operating-face of the matrix; substantially as described.

2. In a matrix-justifying machine, the combination with a plurality of milling-tools spaced for the passage of a blank, and a slide movable between said tools, and provided with a blank-holder, of a gage or positioning-needle adapted to enter the matrix-cavity and by contact with the working face thereof position the blank relatively to the milling-tools, substantially as described.

3. In a matrix-justifying machine, the combination with a milling-tool and a blank-carrier or slide provided with a blank holder or gripper and movable toward and from the milling-tool, of a gage or positioning-needle and devices operating thereon to hold it in or out of operative position; substantially as described.

4. In a milling or matrix-justifying machine the combination with the milling-tool and a movable carrier provided with a blank holder or gripping device, of a positioning-needle and a cam for reciprocating said needle to place and hold it in and out of operative position; substantially as described.

5. In a milling or matrix-justifying machine, the combination of the following elements, to wit; a rotary milling-tool; a slide movable toward and from the milling-tool and provided with a gripping device adjustable in a plane transverse to the line of movement of said slide; a gage for determining the position of said slide; and a blank gage or positioning-needle in fixed relation to said slide, whereby the adjustment of the blank in two transverse planes is effected, to bring a predetermined point on the body opposite the needle; substantially as described.

6. In a milling or matrix-justifying machine, the combination, substantially as described, of the following elements, to wit: a bed; two revolving milling-tools each carried on a block adjustable endwise on the bed by a screw device having a graduated scale; a frame fixed transversely on the bed between the milling-tools; a slide movable in guides on the frame but normally held in contact with an adjustable screw device having a graduated scale at one end of the frame; a gripping device of which the lower jaw is vertically adjustable on the slide by a screw device having a graduated scale; a positioning-needle having an offset; a spring for advancing said needle; a cam engaging the offset on the needle and provided with a stop, said cam being so arranged that in one position the cam-surface and the stop hold the needle fixed in operating position, while in a second position, it holds the needle withdrawn; and means to reciprocate the slide on the frame.

7. In a measuring device for matrix-justifying machines, and in combination, a movable needle—such as F F'—within a fixed stop, and a micrometer-screw, all in an open electric circuit, a catch—such as H$^5$—which arrests the movement of the screw when the circuit is closed by contact being made between the needle and the screw, and an actuating device for the micrometer-screw adapted to break the circuit before the screw is withdrawn from contact with the needle, substantially as described.

8. In a measuring device for matrix-justifying machines, and in combination, a spring-controlled measuring-needle—such as F F'—within a fixed stop and electrically connected with one pole of a battery; a holder—such as D—adjustable in two planes to place a determined point of the body to be measured in contact with the needle when the body is held against the fixed stop; an electromagnet in connection with the other pole of the battery; a micrometer-screw which closes the circuit when brought in contact with the needle; a graduated segment—such as H$^4$—which operates the screw; and a catch—such as H$^5$—controlled by the magnet-armature which locks the screw directly the circuit is closed, substantially as described.

9. In a measuring device for matrix-justifying machines, the combination with a movable measuring-needle—such as F F'—within a fixed stop in electrical connection with one pole of a battery; a micrometer-screw; a metallic bar—such as G$^3$—for operating the screw said bar carrying a graduated scale and having a slot—such as G$^5$—one side of which is an electrical non-conductor; an electromagnet in connection with the other pole of the battery; and an armature operating through a catch to lock the micrometer-screw-operating bar; of a rocking handle—such as H$^3$—in electric connection with the magnet and engaged in the slot of the bar, so as to advance the screw into contact with the needle and close the circuit when rocked in one direction, but to break the circuit on reversal of its movement before the screw is withdrawn from contact with the needle, substantially as described.

10. In a matrix-justifying machine the combination substantially as described of the following elements, to wit; a longitudinally-adjustable spindle carrying a milling-tool; a slide movable in guides at right angles to the milling-spindle and provided with a blank holder or gripping device whose engaging faces are parallel with the axis of the milling-spindle and are adjustable in a plane perpendicular thereto; a longitudinally-movable gage or positioning-needle supported to occupy a fixed relation to the movements of the gripping device; and means for reciprocating said needle.

11. In a matrix-justifying machine the combination substantially as described of the following elements, to wit; a reciprocating blank-holder provided with gripping devices for engaging the blank and presenting it to the milling-tool; a gage or positioning-needle for regulating the position of the blank in its holder preliminary to its presentation to the milling-cutter; a fixed gage in proximity to the positioning-needle for determining the position of the latter when engaged by the milled blank; adjusting devices for the positioning-needle including an electric contact and an electrically-actuated arresting device; and an electric circuit including an electromagnet controlling said arresting device, said circuit being closed through the needle-adjusting devices to arrest the latter.

12. In a matrix-justifying machine and as a means for gaging the position or depth of the matrix the combination substantially as described of the following elements, to wit; a gaging-surface; a depth-gage or positioning-needle projected beyond said gaging-surface and movable toward and from the latter; a movable or adjusting member—such as a micrometer-screw—for determining the position of said needle when the matrix is in engagement therewith and with the gaging-surface, said adjusting member being provided with a measuring-sector and a lock; and an electric circuit controlled by said depth-gage and its adjusting member and including a generator and an electromagnet, the latter actuating the lock to arrest further movement of the adjusting device.

13. In a matrix-justifying machine, the combination with the gage or positioning-needle by which the matrix is located in its carrier preliminary to milling, of the following elements, to wit, a gage whose contact-surface lies in a plane transverse to the axis of the needle and against which the end of the matrix is pressed, to adjust the position of said needle; a measuring mechanism—such as a micrometer—one of whose members contacts with the needle, to determine its position; a lock for arresting said measuring mechanism when contact is made with the needle; actuating devices for said measuring mechanism; an electromagnet for actuating the lock; and an electric circuit including a generator, said electromagnet and two circuit-closing contacts the one controlled by the measuring mechanism and the other by the actuating devices therefor.

14. In a matrix-justifying machine the combination with the matrix-positioning needle of the following elements, to wit; a measuring mechanism—such as a micrometer-screw—provided with an adjusting member furnished with a graduated quadrant; a lock-bar arranged to engage said quadrant and controlled by an electromagnet; an actuating-arm working between conducting and non-conducting contacts on the adjusting member of the measuring mechanism; and an electric circuit including the electromagnet and two circuit-closing contacts the one intermediate the actuating-arm and the said adjusting member and the other intermediate the measuring mechanism and the positioning-needle.

FRANK HINMAN PIERPONT.

Witnesses:
W. J. ROGERS,
R. R. WILSON.